March 13, 1934.  F. H. OWENS  1,950,691
COMBINED TAKE-UP DRIVE AND HANDLE FOR MOTION PICTURE CAMERAS
Original Filed Sept. 9, 1929
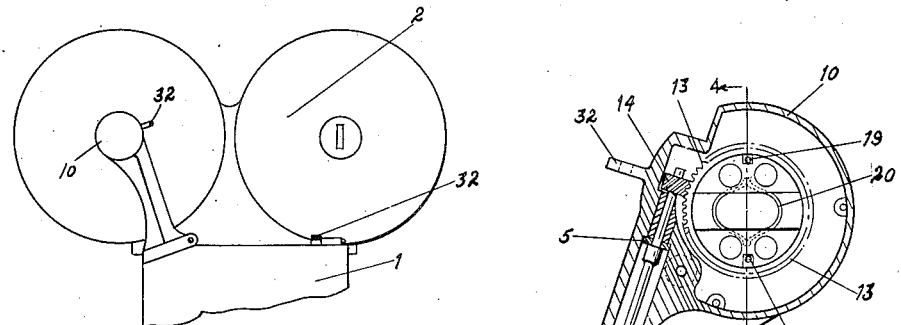
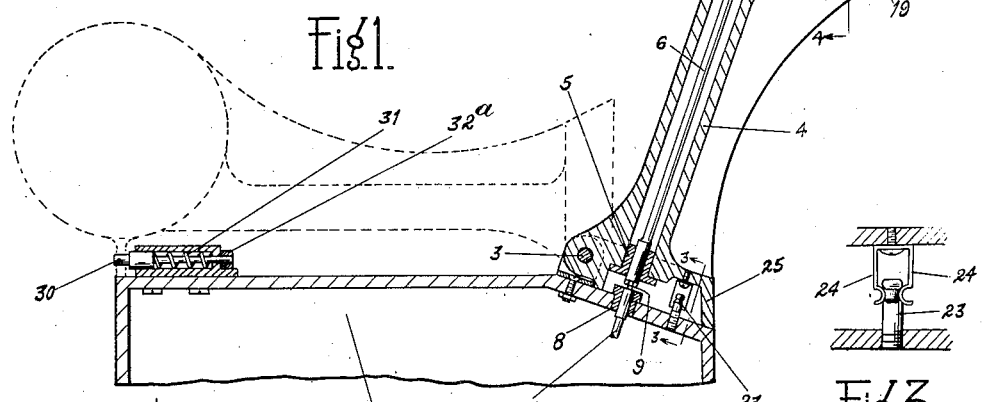
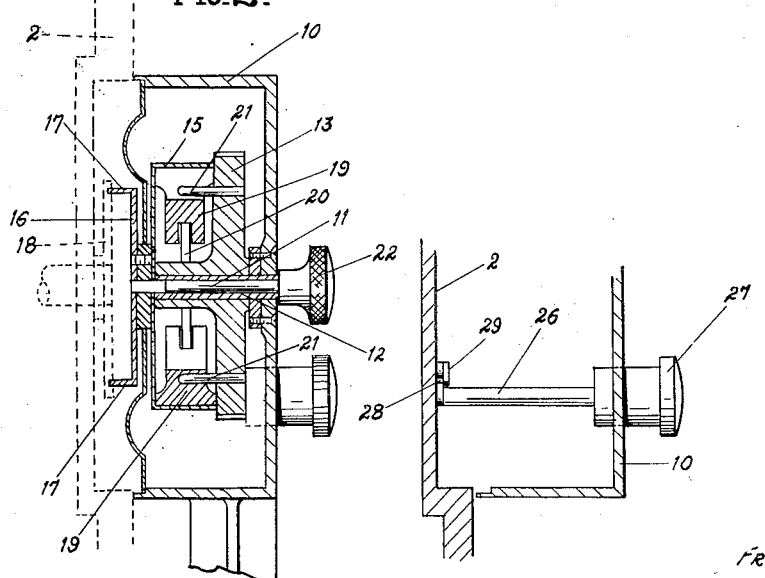
INVENTOR.
FREEMAN H. OWENS.
BY *Philip S. Hopkins*
ATTORNEY.

Patented Mar. 13, 1934

1,950,691

UNITED STATES PATENT OFFICE 1,950,691

COMBINED TAKE-UP DRIVE AND HANDLE FOR MOTION PICTURE CAMERAS

Freeman H. Owens, New York, N. Y.

Application September 9, 1929, Serial No. 391,385
Renewed May 16, 1933

10 Claims. (Cl. 88—17)

This invention relates to improvements in combined take-up drive and handle for motion picture cameras, the principal object of the invention being to provied a device of this character which can readily be operated to change its function from a take-up drive to a carrying handle and vice versa, and which will operate efficiently in either character.

Another object of my invention is to provide a take-up driving mechanism for a motion picture camera which is completely enclosed and which may be adjusted to and locked in operative relation to the take up reel of the camera and adjusted to and locked in position to serve as a handle for the camera.

Other objects and advantages of the invention will appear as the description proceeds.

In the drawing accompanying this specification,

Figure 1 is a diagrammatic side view showing the device in its take-up drive position on the top of a camera box, the latter being shown broken away;

Figure 2 is a vertical sectional view of the device on a larger scale, the broken lines illustrating the handle forming position of said device;

Figure 3 is a detail sectional view taken on line 3—3 of Figure 2 and on a larger scale;

Figure 4 is a sectional view, also on a larger scale, taken on line 4—4 of Figure 2, a portion of the magazine housing being shown in broken lines; and Figure 5 is a sectional view through the wall of the housing for the driving mechanism and the magazine, illustrating the means for locking the device in operative driving position.

Referring to the drawing, 1 designates the upper portion of the body of a motion picture camera, which is adapted to receive a removable magazine 2 carrying the usual film take-up and supply reels. Pivoted as at 3 to the camera at one of the upper corners thereof is a hollow or tubular arm 4 provided adjacent to its opposite ends with bearings 5 in which is mounted for rotation a shaft 6, said shaft extending at its lower end beyond the arm and being bifurcated at that end. Within the camera is mounted for rotation a shaft 7 adapted to be driven by the camera mechanism, said shaft being supported in such direction that when the arm 4 is in the full line position shown in Figure 2, the shafts 6 and 7 will be in longitudinal alignment. The shaft 7 extends through a bearing 8 to the outside of the camera and is provided at its extreme end with a flattened portion or tongue adapted to enter the bifurcation in the end of shaft 6, as indicated at 9 in Figure 2, whereby when the camera is operated motion will be transmitted by the shaft 7 to the shaft 6.

The arm 4 carries at its outer end a housing 10 in which is disposed a shaft 11 (see Figure 4), extending in a direction at right angles to the shaft 6. Surrounding the shaft 11 is a fixed bushing 12 on which is rotatably mounted a worm gear 13 in mesh with a worm 14 secured on the end of shaft 6, whereby rotary motion will be imparted by the shaft 6 to the worm gear 13. Secured on the shaft 11 within the housing 10 is a cup-shaped member 15 having its open end lying adjacent to the gear 13, to the bottom or rear end of which member is secured a driving member 16 disposed outside of the housing 10 and having flange portions or fingers 17 for engaging the cross bar 18 usually carried by the hub of the take-up reel mounted in the magazine 2, the magazine housing being offset inwardly to accommodate this mechanism.

Within the cup-shaped member 15 are disposed a pair of floating segmental members or shoes 19, said shoes being normally maintained spaced apart from each other and in frictional contact with the wall of the member 15 by means of springs 20. The gear 13 is provided with pins 21 extending axially from said gear into perforations formed in the members 19, said perforations being of greater diameter than the pins so that there is a certain amount of play between the pins and said perforations. This construction thus provides a slip or frictional drive between the camera and take-up reel of the magazine. The shaft 11 is provided at one end thereof outside of the housing 10 with a knurled head or knob 22 for manual rotation of the shaft and consequently the driving members 15 and 16 independently of the gear 13, whereby the film may be wound upon the take-up reel by hand to a particular starting point before starting the camera operation.

In the present instance means is shown for automatically engaging and holding the arm 4 when it is thrown up into magazine operating position. This means consists of a light friction holding device comprising a so-called jack 23 secured in the top of the camera body in position to be engaged by a pair of spring fingers 24 secured to the enlarged base 25 of the arm 4, said spring fingers being so formed as to slide over the rounded end of the jack and engage a groove formed therein as shown in Figure 3. This frictional device is sufficient to hold the arm 4 in its raised position and prevent any accidental displacement thereof before engagement of its driving mechanism with the crossbar of the reel hub carried by the magazine. A more positive locking means, however, is provided for holding the arm in position while the driving mechanism is in operation, said means comprising a rod or pin 26 mounted for rotation in the wall of the housing 10 and provided outside of said housing with an enlarged head 27 for hand manipulation. At its inner end the rod 26 is provided with a radial projection or pin 28 adapted to engage beneath a recessed lug 29 formed on the magazine housing thus positively locking the arm 4 and the parts carried thereby in the operative driving position.

When the arm 4 is to be used as a handle for carrying the camera, the positive locking means above described is first released and the arm swung on its pivot into the dotted-line position shown in Figure 2, it being understood that the force necessary to swing the arm will automatically release the spring fingers 24 from the jack 23. An automatic latching device is provided for retaining the arm 4 in its handle-forming position, said device comprising a spring tensioned plunger 30 mounted for reciprocatory movement in a tubular housing 31 secured on the top of the camera box. The arm 4 is provided adjacent its free end with an offset perforated projection or lug 32 so placed that when the arm is being brought to its dotted line position the lug 32 will engage the rounded end of the plunger 30 and press said plunger back against the tension of its spring until the perforation in the lug arrives in alignment with the plunger, whereupon the latter will enter said perforation and thus lock the arm in its horizontal or handle-forming position. The plunger 30 is provided on its rear end with a suitable head 32a to limit its movement in one direction.

It will be understood, of course, that the relative positions of the arm pivot 3 and the plunger 30 on the camera box will be such as properly to balance the weight of the camera on the handle.

I claim:

1. The combination with a camera, including a take up reel, motion transmitting mechanism carried by said camera for said reel, a pivoted elongated housing member on said camera carrying said mechanism and being shiftable into position to form a carrying handle for the camera.

2. The combination with a camera including a take up reel, motion transmitting mechanism carried by said camera for said reel, a pivoted elongated housing member on said camera carrying said mechanism and being shiftable into position to form a carrying handle for the camera, and independent means for locking said member in motion transmitting position and in handle forming position.

3. The combination with a camera, of a tubular member mounted on said camera for movement to two predetermined positions, means carried by said tubular member for transmitting motion from the camera to the take-up reel of a film magazine, said member in one of said positions rendering said motion transmitting means operative and in the other position forming a carrying handle for the camera.

4. The combination with a camera, of a tubular member mounted on said camera for movement to two predetermined positions, means carried by said tubular member for transmitting motion from the camera to the take-up reel of a film magazine, said member in one of said positions rendering said motion transmitting means operative and in the other position forming a carrying handle for the camera, and means carried by the camera for engaging and driving said means only when in motion transmitting position.

5. The combination with a camera, of a tubular member mounted on said camera for movement to two predetermined positions, means carried by said tubular member for transmitting motion from the camera to the take-up reel of a film magazine, said member in one of said positions rendering said motion transmitting means operative and in the other position forming a carrying handle for the camera, means carried by the camera for engaging and driving said means only when in said operative position, and independent means for locking said tubular member in both of said positions.

6. The combination with a camera, of a tubular member pivoted on said camera and adapted to be swung on its pivot into two predetermined positions, a shaft mounted for rotation in said member, gearing carried by said member at one end of said shaft, driving means carried by the camera, cooperating means carried by said driving means and shaft for engaging and rotating the latter when the tubular member is in one position, said member, when swung to the other position, forming a carrying handle for the camera.

7. The combination with a camera and a film magazine having a take-up reel of a shiftable member mounted on said camera, a driven shaft mounted for rotation in said shiftable member, a pinion carried by said shaft, friction gearing carried by said shiftable member in mesh with said pinion and having means for engaging said take-up reel when the shiftable member is in a predetermined position, a driving shaft carried by said camera and adapted to engage said driven shaft when the shiftable member is in reel-engaging position, said member being shiftable to another position to form a carrying handle for the camera and simultaneously disengage the driven shaft from said driving shaft and the take-up reel.

8. The combination with a camera and a film magazine having a take-up reel of a shiftable member mounted on said camera, a driven shaft mounted for rotation in said shiftable member, a pinion carried by said shaft, friction gearing carried by said shiftable member in mesh with said pinion and having means for engaging said take-up reel when the shiftable member is in a predetermined position, a driving shaft carried by said camera and adapted to engage said driven shaft when the shiftable member is in reel-engaging position, said member being shiftable to another position to form a carrying handle for the camera and simultaneously disengage the driven shaft from said driving shaft and the take-up reel, and independent means for locking the shiftable member in both of said positions.

9. The combination with a camera including a take up reel, of an elongated housing member pivoted to said camera and carrying motion transmitting mechanism for said reel, said reel being in position to engage said mechanism when the pivoted member is in one position, means for locking the member in said position, said member being adapted when swung into a different position to form a carrying handle for the camera, and means for locking the member in said last position.

10. The combination with a camera and a film magazine having a take-up reel, of a tubular member pivoted at one end thereof to said camera and shiftable into two predetremined positions on the camera, a shaft mounted for rotation in said tubular member, gearing between said shaft and said take-up reel, means carried by the camera and adapted to negage said shaft for rotating the same when the tubular member is in one of said positions, and means for locking the tubular member in both of said positions.

FREEMAN H. OWENS.